US012783721B2

(12) United States Patent
Song et al.

(10) Patent No.: US 12,783,721 B2
(45) Date of Patent: Nov. 3, 2026

(54) SYSTEM AND METHOD USING INTELLIGENT PRIVACY ASSISTANT MODEL FOR LARGE LANGUAGE MODEL OPERATION

(71) Applicant: The Hong Kong University of Science and Technology, Hong Kong (CN)

(72) Inventors: Yangqiu Song, Hong Kong (CN); Haoran Li, Hong Kong (CN); Wei Fan, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 130 days.

(21) Appl. No.: 18/885,787

(22) Filed: Sep. 16, 2024

(65) Prior Publication Data

US 2025/0131122 A1 Apr. 24, 2025

Related U.S. Application Data

(60) Provisional application No. 63/591,766, filed on Oct. 20, 2023.

(51) Int. Cl.
*H04L 29/06* (2006.01)
*G06F 21/62* (2013.01)

(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 10,417,445 | B2 | 9/2019 | Wouhaybi et al. |
| 10,860,742 | B2 | 12/2020 | Joseph et al. |
| 10,963,571 | B2 | 3/2021 | Bar Joseph et al. |

(Continued)

FOREIGN PATENT DOCUMENTS

| | | | |
|---|---|---|---|
| CN | 116662508 | A | 8/2023 |
| CN | 116796367 | A | 9/2023 |

(Continued)

OTHER PUBLICATIONS

US 11,704,436 B2, 07/2023, Feuz et al. (withdrawn)

(Continued)

*Primary Examiner* — Luu T Pham
*Assistant Examiner* — Fahimeh Mohammadi
(74) *Attorney, Agent, or Firm* — IDEA Intellectual Limited; Sam T. Yip

(57) ABSTRACT

A system includes a text receiver, a rule-based privacy checklist module, a personalized learning module, and a reasoning module. The text receiver converts user input into a machine-readable format. The rule-based privacy checklist module retrieves privacy norms from a database, processes these norms into annotated rules, and compares input data against them to create a structured report. The personalized learning module, using a fine-tuned BERT, classifies contextual information for privacy violations and generates a local privacy report. The reasoning module integrates multi-turn dialogues, applies chain-of-thought reasoning to evaluate the entire context for private information, and delivers comprehensive cloud-based privacy judgments and reports.

18 Claims, 4 Drawing Sheets

(56) References Cited

U.S. PATENT DOCUMENTS

| | | | | |
|---|---|---|---|---|
| 11,070,676 | B2 | 7/2021 | Klingler et al. | |
| 11,995,803 | B1 * | 5/2024 | Karpman | G06T 5/70 |
| 12,038,903 | B1 * | 7/2024 | Fitzgerald | G06F 16/2365 |
| 12,229,810 | B2 * | 2/2025 | Fam | G06F 16/90332 |
| 12,238,213 | B1 * | 2/2025 | Naanaa | G06F 16/345 |
| 12,326,851 | B1 * | 6/2025 | Fitzgerald | G06F 11/3041 |
| 12,499,879 | B1 * | 12/2025 | Soliman | G06F 40/295 |
| 2018/0026991 | A1 | 1/2018 | Bhamidipati et al. | |
| 2020/0082115 | A1 | 3/2020 | Ball et al. | |
| 2022/0129556 | A1 * | 4/2022 | Chen | G06F 21/74 |
| 2022/0191111 | A1 * | 6/2022 | Murugan | G06F 40/30 |
| 2023/0029190 | A1 * | 1/2023 | Gomez | G06F 21/6245 |
| 2023/0130637 | A1 * | 4/2023 | Hosudurg | G06F 21/6218 726/1 |
| 2023/0214502 | A1 * | 7/2023 | Hadi | G06F 40/253 726/30 |
| 2023/0409615 | A1 * | 12/2023 | Khemka | G06F 16/3329 |
| 2025/0095395 | A1 * | 3/2025 | Winter | G06V 30/274 |
| 2025/0112961 | A1 * | 4/2025 | Banerjee | H04L 63/102 |
| 2026/0044541 | A1 * | 2/2026 | Madisetti | G06F 16/3329 |

FOREIGN PATENT DOCUMENTS

| | | | | |
|---|---|---|---|---|
| JP | 2018011203 A | 1/2018 | | |
| WO | WO-2024213993 A1 * | 10/2024 | | G06N 20/00 |

OTHER PUBLICATIONS

Cataldo Musto et al., MyrrorBot: A Digital Assistant Based on Holistic User Models for Personalized Access to Online Services, Aug. 16, 2021, ACM, vol. 39, Issue 4, Article No. 46, pp. 1-34. (Year: 2021).*

Wenhao Lu et al., TwinBERT: Distilling Knowledge to Twin-Structured Compressed BERT Models for Large-Scale Retrieval, Oct. 19, 2020, ACM, pp. 2645-2652. (Year: 2020).*

Na Li er al., Distilling Semantic Concept Embeddings from Contrastively Fine-Tuned Language Models, Jul. 18, 2023, ACM, pp. 216-226. (Year: 2023).*

Bo Liu et al., When Machine Learning Meets Privacy: A Survey and Outlook, Mar. 5, 2021, ACM, vol. 54, Issue 2, Article No. 31, pp. 1-36. (Year: 2021).*

Yangsibo Huang et al., "Privacy Implications of Retrieval-Based Language Models," Proceedings of the 2023 Conference on Empirical Methods in Natural Language Processing, Association for Computational Linguistics, 2023, p. 14887-14902.

Mustafa Safa Ozdayi et al., "Controlling the Extraction of Memorized Data from Large Language Models via Prompt-Tuning," Proceedings of the 61st Annual Meeting of the Association for Computational Linguistics, 2023, vol. 2: Short Papers, p. 1512-1521.

Yansong Li et al., "Privacy-Preserving Prompt Tuning for Large Language Model Services," arXiv:2305.06212v1, 2023.

Haonan Duan et al., "Flocks of Stochastic Parrots: Differentially Private Prompt Learning for Large Language Models," NIPS '23: Proceedings of the 37th International Conference on Neural Information Processing Systems, ACM Digital Library, 2024, Article No. 3358, p. 76852-76871.

Xiang Yue et al., "Synthetic Text Generation with Differential Privacy: A Simple and Practical Recipe," Proceedings of the 61st Annual Meeting of the Association for Computational Linguistics, 2023, vol. 1: Long Papers, p. 1321-1342.

Justus Mattern et al., "Differentially Private Language Models for Secure Data Sharing," Proceedings of the 2022 Conference on Empirical Methods in Natural Language Processing, Association for Computational Linguistics, 2022, p. 4860-4873.

Zhiliang Tian et al., "SeqPATE: Differentially Private Text Generation via Knowledge Distillation," NIPS'22: Proceedings of the 36th International Conference on Neural Information Processing Systems, 2024, Article No. 808, p. 11117-11130.

Yongqin Wang et al., "Characterization of MPC-based Private Inference for Transformer-based Models," 2022 IEEE International Symposium on Performance Analysis of Systems and Software (ISPASS), IEEE, 2022.

Dacheng Li et al., "MPCFORMER: Fast, Performant and Private Transformer Inference With MPC," arXiv:2211.01452v1, 2022, p. 1-16.

Wenxuan Zeng et al., "MPCViT: Searching for MPC-friendly Vision Transformer with Heterogeneous Attention," arXiv:2211.13955v1, 2022.

Meng Hao et al., "Iron: Private Inference on Transformers," NIPS'22: Proceedings of the 36th International Conference on Neural Information Processing Systems, ACM Digital Library, 2024, Article No. 1143, p. 15718-15731.

Zi Liang et al., "Merge: Fast Private Text Generation," The Thirty-Eighth AAAI Conference on Artificial Intelligence (AAAI-24), Association for the Advancement of Artificial Intelligence, 2024, p. 19884-19892.

Yijia Xioa et al., "Large Language Models Can Be Good Privacy Protection Learners," arXiv:2310.02469v1, 2023, p. 1-20.

Irene Solaiman et al., "Evaluating the Social Impact of Generative AI Systems in Systems and Society," arXiv:2306.05949v2, 2023, p. 1-41.

Haoran Li et al., "You Don't Know My Favorite Color: Preventing Dialogue Representations from Revealing Speakers' Private Personas," Proceedings of the 2022 Conference of the North American Chapter of the Association for Computational Linguistics: Human Language Technologies, Association for Computational Linguistics, 2022, p. 5858-5870.

Jie Huang et al., "Are Large Pre-Trained Language Models Leaking Your Personal Information?," Findings of the Association for Computational Linguistics: EMNLP 2022, Association for Computational Linguistics, 2022, p. 2038-2047.

Adam Barth et al., "Privacy and Contextual Integrity: Framework and Applications," Proceedings of the 2006 IEEE Symposium on Security and Privacy (S&P'06), IEEE Computer Society, 2006.

Cynthia Dwork et al., "The Algorithmic Foundations of Differential Privacy," Foundations and Trends in Theoretical Computer Science, now, 2014, vol. 9(3-4), p. 19-20.

Jason Wei et al., "Chain of Thought Prompting Elicits Reasoning in Large Language Models," arXiv:2201.11903v1, 2022.

Nicholas Carlini et al., "Extracting Training Data from Large Language Models," Proceedings of the 30th USENIX Security Symposium, USENIX Association, 2021, p. 2633-2650.

Haoran Li et al., "Sentence Embedding Leaks More Information than You Expect: Generative Embedding Inversion Attack to Recover the Whole Sentence," Findings of the Association for Computational Linguistics: ACL 2023, Association for Computational Linguistics, p. 14022-14040.

Alec Radford et al., "Language Models are Unsupervised Multitask Learners," Parer With Code, 2019.

Haoran Li et al., "Multi-step Jailbreaking Privacy Attacks on ChatGPT." Findings of the Association for Computational Linguistics: EMNLP 2023, Association for Computational Linguistics, 2023, p. 4138-4153.

Alexander Wei et al., "Jailbroken: How Does LLM Safety Training Fail?," NIPS '23: Proceedings of the 37th International Conference on Neural Information Processing Systems, ACM Digital Library, 2024, Article No. 3508, p. 80079-80110.

Gelei Deng et al., "Jailbreaker: Automated Jailbreak Across Multiple Large Language Model Chatbots," arXiv:2307.08715v1, 2023, p. 1-15.

Alexander Wan et al., "Poisoning Language Models During Instruction Tuning," Proceedings of the 40th International Conference on Machine Learning, PMLR, 2023, vol. 202, p. 35413-35425.

Yi Liu et al., "Prompt Injection attack against LLM-integrated Applications," arXiv:2306.05499v2, 2024, p. 1-18.

Tong Liu et al., "Demystifying RCE Vulnerabilities in LLM-Integrated Apps," arXiv:2309.02926v2, 2023, p. 1-15.

Manli Shu et al., "On the Exploitability of Instruction Tuning," NIPS '23: Proceedings of the 37th International Conference on Neural Information Processing Systems, ACM Digital Library, 2024, Article No. 2703, p. 61836-61856.

(56) References Cited

OTHER PUBLICATIONS

Yuntao Bai et al., "Training a Helpful and Harmless Assistant with Reinforcement Learning from Human Feedback," arXiv:2204.05862v1, 2022, p. 1-74.
Yuntao Bai et al., "Constitutional AI: Harmlessness from AI Feedback," arXiv:2212.08073v1, 2022, p. 1-34.
Yehuda Lindell, "Secure Multiparty Computation," Communications of the ACM, 2021, vol. 64(1), p. 86-96.
Martin Abadi et al., "Deep Learning with Differential Privacy," CCS'16, ACM, 2016, p. 308-318.
Vaidehi Patil et al., "Can Sensitive Information Be Deleted From LLMS? Objectives for Defending Against Extraction Attacks," arXiv:2309.17410v1, 2023, p. 1-19.
Tianyu Chen et al., "THE-X: Privacy-Preserving Transformer Inference with Homomorphic Encryption," Findings of the Association for Computational Linguistics: ACL 2022, Association for Computational Linguistics, 2022, p. 3510-3520.
Adina Williams et al., "A Broad-Coverage Challenge Corpus for Sentence Understanding through Inference," Proceedings of NAACL-HLT 2018, Association for Computational Linguistics, 2018, p. 1112-1122.
Alex Wang et al., "Glue: A Multi-Task Benchmark and Analysis Platform for Natural Language Understanding," ICLR 2019, arXiv:1804.07461v3, 2019, p. 1-20.
Jacob Devlin et al., "BERT: Pre-training of Deep Bidirectional Transformers for Language Understanding," Proceedings of NAACL-HLT 2019, Association for Computational Linguistics, 2019, p. 4171-4186.
Yinhan Liu et al., "RoBERTa: A Robustly Optimized BERT Pretraining Approach," ICLR 2020, OpenReview, 2020, p. 1-15.
Tobias Lauinger et al., "Honeybot, Your Man in the Middle for Automated Social Engineering," LEET'10: Proceedings of the 3rd USENIX conference on Large-scale exploits and emergent threats: botnets, spyware, worms, and more, ACM Digital Library, 2010, p. 11.
Hyunji Chung et al., "Alexa, Can I Trust You?," Computer, ACM Digital Library, 2017, vol. 50(9), p. 100-104.
Xinyu Lei et al., "The Insecurity of Home Digital Voice Assistants—Vulnerabilities, Attacks and Countermeasures," 2018 IEEE Conference on Communications and Network Security (CNS), IEEE, 2018.
Haochen Liu et al., "Say What I Want: Towards the Dark Side of Neural Dialogue Models," arXiv:1909.06044v3, 2019, p. 1-11.
Emily Dinan et al., "Build it Break it Fix it for Dialogue Safety: Robustness from Adversarial Human Attack," Proceedings of the 2019 Conference on Empirical Methods in Natural Language Processing and the 9th International Joint Conference on Natural Language Processing, Association for Computational Linguistics, 2019, p. 4537-4546.
Sean Kennedy et al., "I Can Hear Your Alexa: Voice Command Fingerprinting on Smart Home Speakers," 2019 IEEE Conference on Communications and Network Security (CNS), IEEE, 2019, p. 232-240.
Milind Shah et al., "Privacy Protected Modified Double Ratchet Algorithm for Secure Chatbot Application," Proceedings of the Third International Conference on Smart Electronics and Communication (ICOSEC 2022), IEEE, 2022, p. 747-754.
Jide Edu et al., "Exploring the Security and Privacy Risks of Chatbots in Messaging Services," IMC '22, ACM, 2022.
Aman Priyanshu et al., "Are Chatbots Ready for Privacy-Sensitive Applications? An Investigation into Input Regurgitation and Prompt-Induced Sanitization," arXiv:2305.15008v1, 2023.
Xudong Pan et al., "Privacy Risks of General-Purpose Language Models," 2020 IEEE Symposium on Security and Privacy, IEEE, 2020, p. 1314-1331.
Congzheng Song et al., "Information Leakage in Embedding Models," Session 2A: ML and Information Leakage, CCS '20, ACM, 2020, p. 377-390.
Kang Gu et al., "Towards Sentence Level Inference Attack Against Pre-trained Language Models," Proceedings on Privacy Enhancing Technologies, 2023, vol. 2023(3), p. 62-78.
Minxin Du et al., "Sanitizing Sentence Embeddings (and Labels) for Local Differential Privacy," WWW'23, ACM, 2023.
Yi Liu et al., "Jailbreaking ChatGPT via Prompt Engineering: An Empirical Study," arXiv:2305.13860v1, 2023, p. 1-12.
Andy Zou et al., "Universal and Transferable Adversarial Attacks on Aligned Language Models," arXiv:2307.15043v1, 2023, p. 1-30.
Jules White et al., "A Prompt Pattern Catalog to Enhance Prompt Engineering with ChatGPT," arXiv:2302.11382v1, 2023.
Fábio Perez et al., "Ignore Previous Prompt: Attack Techniques for Language Models," ML Safety Workshop, 36th Conference on Neural Information Processing Systems (NeurIPS 2022), arXiv:2211.09527v1, 2022, p. 1-21.
Kai Greshake et al., "Not what you've signed up for: Compromising Real-World LLM-Integrated Applications with Indirect Prompt injection," arXiv:2302.12173v2, 2023, p. 1-33.
Da Yu et al., "Selective Pre-training for Private Fine-tuning," arXiv:2305.13865v1, 2023, p. 1-19.
Timour Igamberdiev et al., "DP-BART for Privatized Text Rewriting under Local Differential Privacy," Findings of the Association for Computational Linguistics: ACL 2023, Association for Computational Linguistics, 2023, p. 13914-13934.
Oluwaseyi Feyisetan et al., "Privacy- and Utility-Preserving Textual Analysis via Calibrated Multivariate Perturbations," Technical Presentation, WSDM '20, ACM, 2020, p. 178-186.
Cehn Qu et al., "Natural Language Understanding with Privacy-Preserving BERT," CIKM '21, ACM, 2021, p. 1488-1497.
Weiyan Shi et al., "Just Fine-tune Twice: Selective Differential Privacy for Large Language Models," Proceedings of the 2022 Conference on Empirical Methods in Natural Language Processing, Association for Computational Linguistics, 2022, p. 6327-6340.
Da Yu et al., "Differentially Private Fine-Tuning of Language Models," TPDP 2022, Journal of Privacy and Confidentiality, 2024, vol. 14(2), p. 1-26.
Fatemehsadat Mireshghallah et al., "Differentially Private Model Compression," NIPS'22: Proceedings of the 36th International Conference on Neural Information Processing Systems, ACM Digital Library, 2024, Article No. 2137, p. 29468-29483.

* cited by examiner $$\text{inrole}(p_1, \textit{covered-entity}) \wedge \text{inrole}(p_2, \textit{individual}) \wedge (q = p_2) \wedge (t \in \textit{phi}) \quad (2)$$

$$\text{inrole}(p_1, \textit{covered-entity}) \wedge \text{inrole}(p_2, \textit{provider}) \wedge \text{inrole}(q, \textit{patient}) \wedge (t \in \textit{phi}) \quad (3)$$

$$\text{inrole}(p_1, \textit{covered-entity}) \wedge \text{inrole}(p_2, \textit{individual}) \wedge (q = p_2) \wedge (t \in \textit{psychotherapy-notes}) \rightarrow \Diamond \exists p : P.\ \text{inrole}(p, \textit{psychiatrist}) \wedge \text{send}(p, p_1, \textit{approve-disclose-psychotherapy-notes}) \quad (4)$$

$$\text{inrole}(p_1, \textit{covered-entity}) \wedge \text{inrole}(p_2, \textit{individual}) \wedge \text{inrole}(q, \textit{individual}) \wedge (t \in \textit{condition-and-location}) \wedge \Diamond \exists m' : M.\ \text{send}(p_2, p_1, m') \wedge \text{contains}(m', q, \textit{name}) \quad (5)$$

$$\text{inrole}(p_1, \textit{covered-entity}) \wedge \text{inrole}(p_2, \textit{clergy}) \wedge \text{inrole}(q, \textit{individual}) \wedge (t \in \textit{directory-information}) \quad (6)$$

FIG. 2

SYSTEM AND METHOD USING INTELLIGENT PRIVACY ASSISTANT MODEL FOR LARGE LANGUAGE MODEL OPERATION

TECHNICAL FIELD

The present invention generally relates to machine-learning (ML) techniques for large language models (LLMs). More specifically, the present invention relates to systems and methods using an intelligent privacy assistant model for LLM operation.

BACKGROUND

Regarding current status of Large Language Models (LLMs), the emergence of language models (LMs) has stepped into a transformative era of revolutionary advancements in natural language processing and its impact on society. Currently, impressive progress can be observed in large generative language models, which integrate diverse natural language processing tasks to create a unified framework for text generation. Inspired by the game changing ability, more and more attention from researchers, industrial engineers, investors and interested individuals is being paid to LLMs.

The current success and future potential of LLMs can be attributed to multiple factors. Firstly, LLMs revolutionize many applications such as machine translation, code generation, chatbots and question answering. For example, some operations can even provide professional feedback to help complete program codes. These pioneering LLM applications receive massive profits and future investments. Secondly, given access to external tools, LLMs may support more complex real-life tasks. Thirdly, it is trending for researchers and industrial engineers to empower autonomous agents with LLMs for planning and tool usage. Such autonomous agents are capable of using tools with reasoning and self-reflection to execute given tasks without additional training costs. Based on the above promising perspectives, innovative endeavors are attempted by technology companies to integrate LLMs into users' smart devices to improve the service.

However, with respect to the privacy issues of LLMs, despite the promising personalized usage of LLMs, unrestricted access to these models can also lead to potential privacy risks. Such privacy risks are further amplified when LLMs are deployed on personal edge devices and can freely access users' data without restrictions.

Existing research frequently reports privacy vulnerabilities during interactions with LLMs. With the development of language models, several privacy attacks are proposed to extract private information. Some studies focus on training data extraction from variants of GPT-2 language models, showing that by prepending verbatim texts as prefixes, LMs might complete the generation with private information included in the LMs' training corpus. Besides directly extracting training data, other works study the information leakage of LMs' vectorized sentence representations and demonstrate that sensitive attributes and even input texts can be recovered from such representations. Further, some works conduct jailbreaking attacks on LLMs with misleading role-play contexts (prompts) to misguide LLMs into generating unsafe responses, including personally identifiable information. For application-integrated LLMs, prompt injection attacks involve manipulating or inserting harmful content into the given prompt, resulting in undesired model behaviors or outputs. Consequently, privacy concerns frequently arise due to these vulnerabilities.

Furthermore, there are unsolved privacy issues for deploying LLMs on personal devices. When deploying such LLM systems into personal devices, several privacy concerns remain unaddressed. First, the definition of private digital data is ambiguous. The perception of privacy is influenced by existing regional privacy legislation, social norms, religious beliefs and technological developments. It is hard for LLMs to determine what data can be accessed and what cannot. Second, existing data cleaning approaches lack context understanding ability. Simply removing pre-defined privacy patterns may incur additional errors. For example, when users want to write a novel with made up roles, these roles' fake information may be regarded as private information during data processing. Therefore, LLMs may fail to improvise stories even based on fake information to meet the users' demands. Lastly, current LLM systems cannot offer acceptable privacy explanations. Since LLMs are widely viewed as black-box models, improper interpretation of privacy mechanisms may lead to untrusted service users.

Hence, to build responsible LLMs for public benefit, it is empirical for system developers to tackle the aforementioned privacy concerns and implement safe-to-use LLM systems during the inference stage where users are willing to use these powerful tools to bring creativity and productivity.

SUMMARY OF INVENTION

It is an objective of the present invention to provide an apparatus and a method to address the aforementioned issues in the prior arts.

Accordingly, since prior safety mechanisms are insufficient to support LLM systems on smart devices to respect a high volume of personal data, in the present disclosure, implementing an intelligent privacy assistant based on a three-level privacy protection framework is proposed to safeguard users' personal data during interactions with LLM systems. The proposed intelligent privacy assistant (IPA) model of the present invention enables a personalized smart assistant to make privacy judgments based on existing privacy laws, social norms and users' preferences. The proposed IPA model of the present invention is able to:

(1): provide systematic privacy judgments from the given context to strictly follow privacy laws;

(2): offer reasonable and privacy law oriented interpretations from the given privacy judgments; and (3): enable personalized assistants on users' smart devices with low costs.

Briefly, the proposed IPA model of the present invention provides three-level privacy protection. The first level includes rule-based privacy knowledge annotated from existing privacy laws and social norms. The second level develops a small language model that can be easily deployed on users' devices to learn their preferences and offer privacy judgments with contextual information. The third level resorts to large language models on the cloud to improve the reasoning ability over long context such as multi-turn conversations to determine privacy violations.

To address the challenges as afore-described, a framework for an IPA model is provided, introducing three new technologies and innovations that set it apart from previous research:

1. Broader Privacy Coverage: The IPA model's level 1 privacy checklist goes beyond simplistic scenarios and policies by encompassing existing privacy laws (e.g., HIPAA, CCPA, GDPR) through rule-based interpretations. This expands the scope of privacy studies and makes the IPA model the first privacy tool that addresses broad privacy concerns.

2. Human-centric Privacy Alignment: The IPA model, especially level 2, prioritizes privacy by aligning its small language model with privacy laws, social norms, and personal preferences. It follows privacy-by-design principles and complies with regulations like GDPR and CCPA. Users have control over their privacy settings and can customize their interactions. The IPA model advocates for users and promotes features such as granular privacy settings, consent management tools, and the ability to opt out of certain data processing activities. By respecting personal preferences, the IPA model strives to create an environment where individuals feel in control of their data and privacy.

3. Enhanced Privacy Reasoning with LLMs: The IPA model proposes a reasoning module that leverages LLMs to obtain the best privacy judgment over a long context (level 3). It integrates technologies such as prompting, chain-of-thought reasoning, and reinforcement learning from human feedback. These state-of-the-art technologies enhance LLMs' privacy reasoning ability, enabling powerful determination of privacy violations.

In accordance with a first aspect of the present invention, a system using an intelligent privacy assistant model for large language models operations is provided. The system includes a text receiver, a rule-based privacy checklist module, a personalized learning module, and a reasoning module. The text receiver is for parsing and preprocessing input data from at least one user so as to convert user-input text into a machine-readable format. The rule-based privacy checklist module is configured to query a database for retrieving privacy norms and processing these norms to create annotated rules, in which the rule-based privacy checklist module processes the input data from the text receiver and compare it against the annotated norms and rules, thereby compiling and formatting findings from the comparing into a readable structured report. The personalized learning module receives the input data via the text receiver and is configured to process and interpret the input data to understand contextual information thereof. The personalized learning module comprises a fine-tuned BERT module for classifying whether the contextual information constitutes a privacy violation, in which classification results by the fine-tuned BERT module is locally processed to generate a local privacy report. The reasoning module receives the input data via the text receiver and is configured to integrate multi-turn dialog contexts to assess privacy based on server-side reasoning. The reasoning module extracts integrated context and utilizes chain-of-thought (CoT) reasoning to evaluate whether entire context of integrated context has private information. The reasoning module delivers comprehensive privacy judgments for interactions occurring on cloud at a stage of evaluation for the private information and generates a cloud-based report.

In accordance with a second aspect of the present invention, a method using an intelligent privacy assistant model for large language models operations is provided. The method includes steps as follows: parsing and preprocessing, by a text receiver, input data from at least one user so as to convert user-input text into a machine-readable format; querying, by a rule-based privacy checklist module, a database for retrieving privacy norms and processing these norms to create annotated rules, wherein the rule-based privacy checklist module processes the input data from the text receiver and compare it against the annotated norms and rules, thereby compiling and formatting findings from the comparing into a readable structured report; receiving, by a personalized learning module, the input data via the text receiver; processing and interpreting, by the personalized learning module, the input data to understand contextual information thereof, wherein the personalized learning module comprises a fine-tuned BERT module for classifying whether the contextual information constitutes a privacy violation, and wherein classification results by the fine-tuned BERT module is locally processed to generate a local privacy report; receiving, by a reasoning module, the input data via the text receiver; and integrating, by the reasoning module, multi-turn dialog contexts to assess privacy based on server-side reasoning, wherein the reasoning module extracts integrated context and utilizes chain-of-thought (CoT) reasoning to evaluate whether entire context of integrated context has private information, and wherein the reasoning module delivers comprehensive privacy judgments for interactions occurring on cloud at a stage of evaluation for the private information and generates a cloud-based report.

By the configuration above, an intelligent privacy assistant (IPA) with a 3-level privacy judgment framework is provided to give responsible privacy-related judgment through text descriptions with explanations from existing privacy laws and personal preferences. The ultimate goal of the proposed IPA is to use a 3-level privacy judgment framework to check privacy violations given textual descriptions. As a result, the proposed IPA of the present invention can be easily deployed on users' smart devices to safeguard their data privacy, while also enhancing privacy assessments through server-side reasoning.

BRIEF DESCRIPTION OF DRAWINGS

Embodiments of the invention are described in more details hereinafter with reference to the drawings, in which:

FIG. 2 depicts exemplary norms from the Health Insurance Portability and Accountability Act privacy rule;

DETAILED DESCRIPTION OF THE INVENTION

Figure 1:
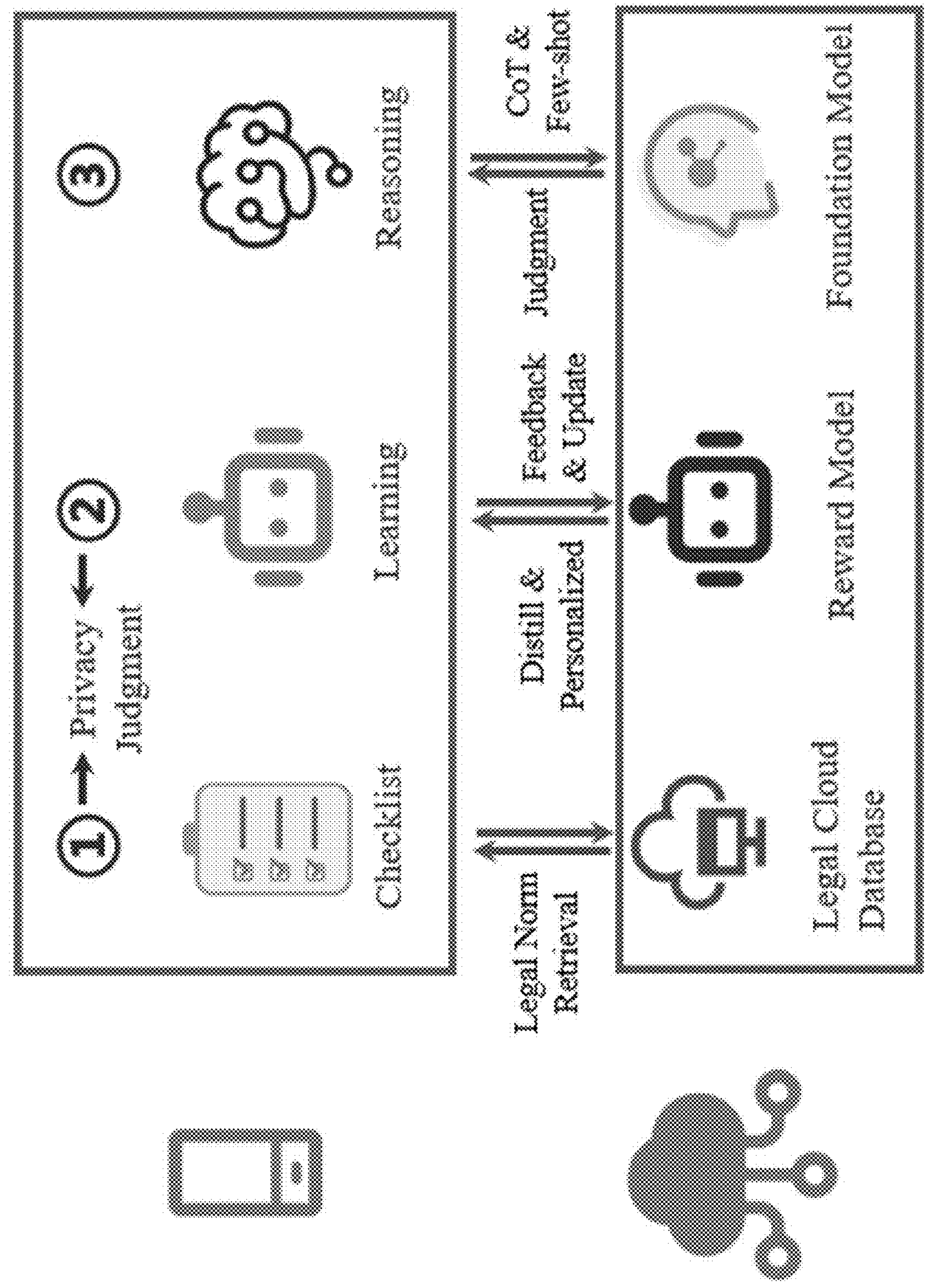
FIG. 1 depicts a schematic diagram of a model framework for a prototype of an IPA according to some embodiments of the present invention.

In the following description, systems and methods using an intelligent privacy assistant model for large language models (LLMs) operation and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The astonishing progress of LLMs has greatly improved the capacity to efficiently address various downstream NLP tasks and consolidate them into generative pipelines. Powerful language models, trained on extensive textual data, have provided unmatched accessibility and usability for both models and users. Currently, companies from the technology industry view LLMs as powerful tools that can drive innovation and improve their services. Many startups and applications integrate LLMs into their products and services to attract and facilitate users. Consequently, LLMs receive an unprecedented welcome from people worldwide. However, these models' unrestricted access may lead to potential privacy risks, both malicious and unintentional. Large language models are typically trained on vast amounts of text data, which can include sensitive information and personal identifiable information (PII) such as medical records, private conversations, and financial data. Despite ongoing efforts to anonymize and remove identifiable information, data leakage issues occasionally occur during LLMs' usage.

In this regard, there are several related studies/works for the LLMs' privacy issues, stated as follows.

1) Existing LLMs' Privacy Defense Technologies

Currently, there are several existing privacy defense technologies to enhance LLMs' privacy protection and enhance LLMs' robustness against privacy attacks. These privacy defenses integrate Differential Privacy (DP), secure multiparty computation (SMPC), and additional privacy objectives into LLM systems. In Table 1, prior works on DP and SMPC are listed.

TABLE 1

Prior works on DP and SMPC-based LLMs.

| Privacy Defense Category | Subcategory |
|---|---|
| DP-based LLMs | DP-based Pre-training |
| | DP-based Fine-tuning |
| | DP-based Prompt Tuning |
| | DP-based Synthetic Text Generation |
| SMPC-based LLMs | — |

1.1) Existing LLMs' Privacy Defense Technologies-Differential Privacy (DP)

Differential privacy guarantees that model training can be achieved through the use of noisy optimization algorithms like DPSGD. DPSGD introduces Gaussian noise on a per-sample basis, using specified noise scales, to the computed gradients during optimization steps. This approach can be easily integrated into different models, making it the foundation for most privacy-preserving Language Model research. In summary, existing DP-based LLMs can be classified into four clusters: DP-based pre-training, DP-based fine-tuning, DP-based prompt tuning, and DP-based synthetic text generation.

1.2) Existing LLMs' Privacy Defense Technologies-Secure Multi-Party Computation (SMPC)

In the context of LLMs, secure multi-party computation is a cryptographic technique that allows multiple parties to work together in training LLMs while maintaining the privacy of their individual data. This approach ensures that each party can contribute their local data to the training process without divulging any sensitive information. Presently, secure multi-party computation is primarily employed during the inference phase of LLMs to protect the privacy of both the model parameters and the inference data.

1.3) Existing LLMs' Privacy Defense Technologies-Additional Privacy Objectives

Besides existing frameworks that can be directly integrated into LLM systems, there are also several works on introducing additional privacy objectives during LLMs' optimization stages. For instance, one of the related works introduces a combination of model weights editing methods and six defense strategies to safeguard against data extraction attacks. One of the related works proposes a training-based approach to identify poisoned data samples against backdoor attacks.

2) Insufficiency of Existing Privacy Technologies

In this section, the weaknesses of the aforementioned privacy protection technologies are identified and preliminary evaluation results are given to demonstrate DP's degraded utility.

For DP-based LLMs, preliminary evaluations are conducted on DP-tuned LLMs with various tuning technologies. More specifically, both DP and non-DP tuning is performed on the Multi-Genre Natural Language Inference (MNLI) corpus from the General Language Understanding Evaluation (GLUE) benchmark based on Bidirectional Encoder Representations from Transformers (BERT) and RoBERTa models. In Table 2, preliminary evaluation results on percentage accuracy are reported. The table indicates that DP-tuned LLMs suffer ~10% accuracy drop on average for the single task. These results suggest that DP-enhanced LLMs lead to degraded utility and require efforts on model and hyper-parameter tuning.

TABLE 2

Preliminary LLM performance evaluation results on MNLI.

| | Non-DP | | | DP ($\varepsilon$ = 8, $\delta$ = 1e−5) | | |
|---|---|---|---|---|---|---|
| | Fine-tune | Prompt-tuning | Prefix-tuning | Fine-tune | Prompt-tuning | Prefix-tuning |
| $\text{BERT}_{base}$ | 82.97 | 66.38 | 79.20 | 65.19 | 47.44 | 43.69 |
| $\text{BERT}_{large}$ | 85.31 | 66.17 | 83.63 | 71.90 | 61.67 | 52.30 |
| $\text{RoBERTa}_{base}$ | 87.45 | 67.65 | 83.97 | 76.45 | 46.26 | 49.16 |
| $\text{RoBERTa}_{large}$ | 90.10 | 70.49 | 89.74 | 83.53 | 60.81 | 64.10 |

For SMPC, existing SMPC technologies cannot be directly applied to LLMs' non-linear layers. Existing works have proposed new LLM architectures to replace non-linear layers with linear layers. Unfortunately, due to different model architectures, LLMs' pre-trained weights cannot be reused for SMPC technologies. In addition, SMPC brings the extra computational cost to further slowdown LLMs' inference speed. Consequently, SMPC-based LLMs are still far away from downstream applications.

For additional learning-based privacy objectives, though introducing a single privacy objective may work well for a specific covered scope, these objectives fail to generalize to other situations. On the other hand, privacy is a multi-faceted concept influenced by various factors such as personal preferences, legal requirements, and cultural norms. Therefore, a broader set of privacy objectives is required to ensure a comprehensive and adaptable framework.

In the present invention, a model framework for an intelligent privacy assistant (IPA) model is provided, as stated below.

An overview of the IPA model is given first. Privacy is a widely studied topic in computer science across various fields, each with its own definition and formulation of privacy. In Computer Vision, social platform privacy is still studied. In Software and Security, mobile applications' privacy is still researched. In Natural Language Processing (NLP), privacy issues related to LLMs are currently investigated. In the present disclosure, the IPA model framework is provided to align privacy with existing privacy laws and social norms.

FIG. 1 depicts a schematic diagram of a model framework for a prototype of an IPA according to some embodiments of the present invention. As shown in FIG. 1, the ultimate goal of the proposed IPA model is to use a 3-level privacy judgment framework to check for privacy violations given textual descriptions. The proposed checklist and distilled model can be easily used on local devices, enabling privacy checks on edge devices without high costs. Moreover, in some embodiments, if there is not enough confidence in level 1 and level 2 judgments, the level 3 reasoning module is employed to determine privacy violations using the foundation model deployed on the cloud server.

To achieve the model framework for the IPA, an architecture with three levels is set up, including "Level 1: Rule-based Privacy Checklist," "Level 2: Personalized Learning Module," and "Level 3: Reasoning Module." They are stated as follows, respectively.

(A): Level 1: Rule-Based Privacy Checklist

The primary function of this layer is to align privacy judgments based on existing privacy laws for broader impact.

The concept of contextual integrity is followed to formulate privacy as information transformation norms. During each transformation, three actors are involved: the sender, receiver, and information subject. The sender tells the attribute information of the subject to the receiver. The whole context of the information transmission should be considered to conclude whether the information transmission is regarded as a positive or negative norm. The positive norm is accepted by privacy law, while the negative norm violates the privacy law. With such formulation and careful annotations, a rule-based system can be easily developed to efficiently determine privacy violations based on users' smart devices without a heavy computational burden. Since the checklist is rule-based, high precision for the privacy judgment can be expected.

FIG. 2 depicts exemplary norms from the Health Insurance Portability and Accountability Act (HIPAA) privacy rule. The illustration of FIG. 2 gives examples of logical formulations of information transmission based on contextual integrity. After collecting or annotating norms from the related privacy laws, rule-based privacy judgments may be performed by scanning through these norms.

(B): Level 2: Personalized Learning Module

Besides rule-based checking of level 1, sometimes users may input fake and irrelevant PII that do not violate anyone's privacy. It should be expected to send these safe PII to the server for better LLM service. However, simply deploying a rule-based checklist may fail to understand the complex contextual situations and consider the fake information as private information. Thus, in the present invention, a learning module should be proposed to learn from a given context to determine whether the mentioned PII should be considered as confidential information.

In the present invention, to address the lack of context understanding, a tiny masked language model, BERT, is proposed to be fine-tuned to classify whether the contextual information may constitute a privacy violation. Instead of directly fine-tuning the BERT model, necessary knowledge from existing large language models is planned to be distilled to enhance the tiny LM's robustness and performance. For the cloud server, suppose one foundation model already exists. A (smaller) reward model may be constructed with supervised fine-tuning or reinforcement learning from human feedback (RLHF) to learn privacy violations with given descriptions. The reward model can then be used to update the Foundation Model via reinforcement learning.

A personalized tiny language model may then be distilled from the reward model. This small model can be directly used on edge devices such as smartphones to conduct privacy judgments locally. The tiny model can also learn users' privacy preferences during phone usage. The whole learning module will keep its accessed personal data locally to avoid unnecessary data leakage.

Moreover, to make up for the checklist's high precision, the small model can be trained to maximize its recall to raise privacy alarms.

(C): Level 3: Reasoning Module

Both level 1 and level 2 judgment are able to conduct primary privacy violation detections. However, in real-life situations, it is common for users to chat with LLMs over a long span with multiple round dialogs. Such multi-turn conversations may still reveal private information by associating the whole context even though each conversation sentence does not include private information. Since the entire context is already accessible to LLMs, LLMs may need an additional reasoning module to determine whether the current context includes private information. If the whole context contains no private information, such context can be safely used as LLMs' training data. Otherwise, LLMs should not be further trained on the private data.

Hence, a reasoning module with Chain-of-Thought (CoT) reasoning and few-shot in-context learning is constructed to leverage LLMs' powerful understanding ability. More specifically, step-by-step reasoning templates may be designed to allow LLMs to self-reflect on whether the accessed data and their responses include personal information. Such complex reasoning can further assist the IPA model in providing judgments for multi-turn dialog scenarios.

Moreover, if users want to seek privacy judgments from LLMs in the cloud, the edge devices may send related information to the server side, where a step-by-step prompt will be prepared to provide the corresponding privacy judgments.

The following descriptions provide further positive effects, including key technologies and inventive features, and practical use cases for the aforementioned architecture and mechanisms.

Key Technologies and Inventive Features:

(I): Three Level IPA Model with Explainable Privacy Judgments

In this section, the highlighted is the key technologies and inventive features of the proposed IPA model of the present invention.

(I-1): Broader Privacy Coverage

Figure 3:
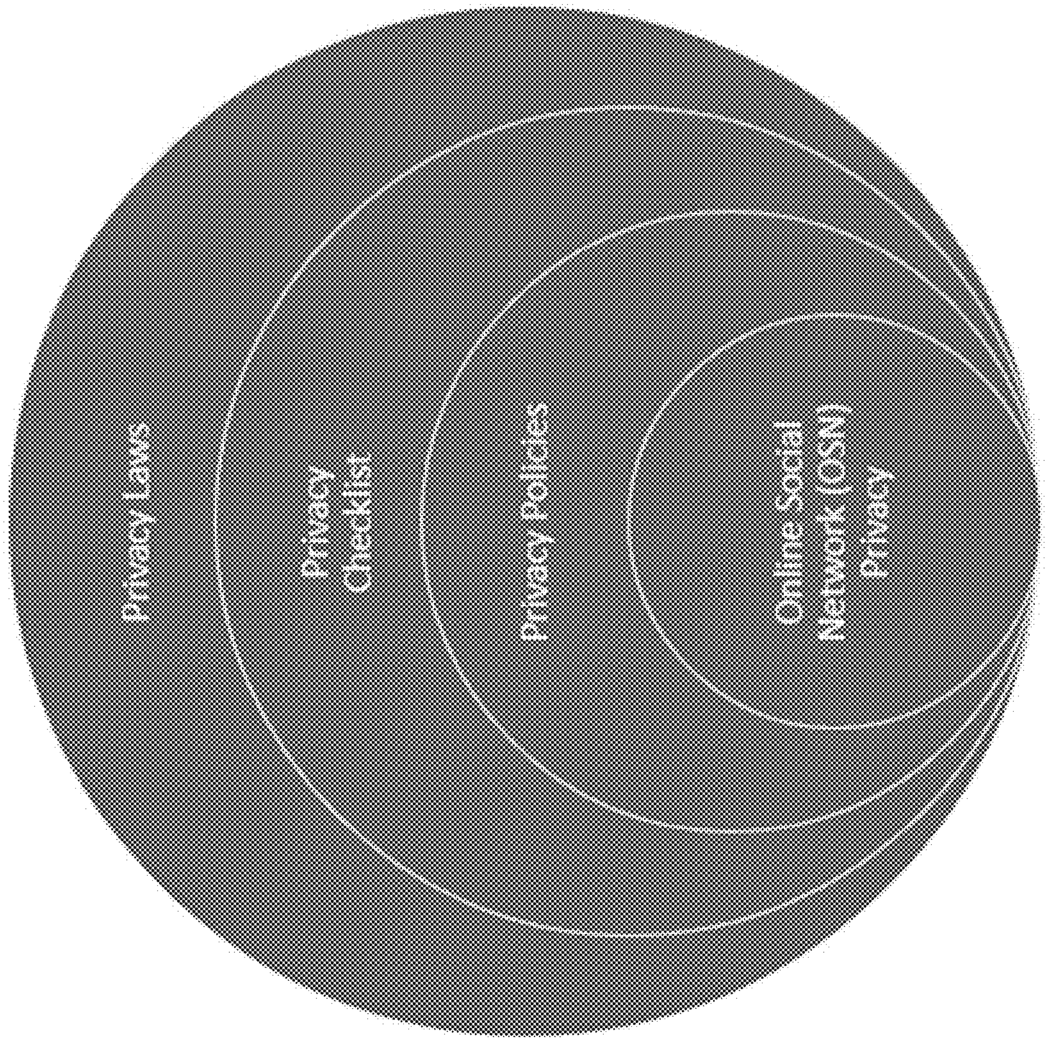
FIG. 3 depicts a schematic Venn diagram of privacy coverage according to some embodiments of the present invention.

FIG. 3 depicts a schematic Venn diagram of privacy coverage according to some embodiments of the present invention. As shown in the illustration of the Venn diagram, the proposed level 1 privacy checklist represents a pioneering effort to expand privacy studies beyond simplistic scenarios and policies, encompassing existing privacy laws through reasonable interpretations. Unlike previous research that restricts its investigations to limited scenarios and rules, the proposed IPA model stands out as the first useful privacy tool on LLMs that addresses broad scopes.

(I-2): Human-Centric Privacy Alignment

For both level 1 and level 2, the IPA model offers human-centric privacy alignment with existing privacy laws, social norms and personal preferences. Such alignment extends privacy studies on LLMs to real-life general use cases. By incorporating human-centric privacy alignment into both level 1 and level 2 systems, the IPA model ensures that inference stage interactions with LLMs adhere to user-desired outcomes.

Since the provided IPA model implements privacy-by-design principles, the IPA-enhanced LLMs are designed with privacy as a fundamental component and satisfy legal requirements. Moreover, the proposed level 2 respects the users' preferences to customize the level of privacy they desire when interacting with LLMs. The IPA model advocates for users and promotes features such as granular privacy settings, consent management tools, and the ability to opt out of certain data processing activities. By respecting personal preferences, the IPA model strives to create an environment where individuals feel in control of their data and privacy.

In summary, the IPA model's human-centric privacy alignment approach enables LLMs to operate in a manner to respect existing privacy laws, social norms, and personal preferences. By extending to real-life use cases, the IPA model aims to foster trust, transparency, and accountability in the evolving landscape of LLM technologies.

(I-3): Enhanced Privacy Reasoning with LLMs

To obtain the best privacy judgment over a long context, in level 3, the reasoning module is proposed with the help of LLMs. Moreover, several sophisticated new technologies, including prompting, chain-of-thought reasoning, and reinforcement learning from human feedback, are integrated to enhance LLMs' privacy reasoning ability over a long context. These state-of-the-art technologies make the IPA model stand out in determining privacy violations with powerful reasoning ability.

(II): Potential Impact

To understand the applicability of the proposed IPA model, there are two exemplary use cases are listed for showing how to apply the IPA model to address common privacy concerns.

(II-1): Privacy Violation Detection During the LLM Inference Stage

The most common case is the interactions between LLM users and LLMs during the inference stage. When it comes to LLM systems developed for users' smart devices, the level 1 privacy checklist is directly exploited to efficiently determine privacy violations. In this case, the sender should be the user, and the receiver can either be model owners or anyone (e.g., if the information is further fine-tuned for the LLM, and the LLM can be accessed by any other user). The subject is also the user itself. Thus, the rule-checking can be conducted with the checklist to determine privacy violations. Moreover, the level 2 local model is also used to do the privacy violation classification.

(II-2): Privacy Judgment for Multi-Turn Conversations as Context

The multi-turn conversations require a more powerful understanding ability to judge privacy violations. In this case, the LLM itself is exploited to detect privacy violations with the level 1 checklist as the backbone. Such steps can be done via self-checking (constitutional AI) and Chain-of-Thought reasoning.

Additionally, the level 2 module can learn about users' privacy preferences to understand users' social norms toward privacy. Such user-level privacy preferences are also vital to multi-turn privacy judgment. In summary, to solve this type of complex problem, basic knowledge (level 1), learning (level 2) and reasoning (level 3) abilities are all necessary to understand the long context and make the correct privacy judgments.

(II-3): Potential Practical Use Scenario

The provided IPA model offers a unique and essential solution to the rising concerns surrounding privacy and security in the digital age. As individuals increasingly rely on their smart devices to interact with AI models for various tasks, such as online banking, customer service, and built-in voice assistants, the need to safeguard their sensitive information becomes paramount.

Moreover, the versatility of the provided IPA model enables seamless integration across a wide range of smart devices, including smartphones, tablets, smartwatches, and even smart home appliances. This compatibility ensures that the provided IPA model cater to the diverse needs.

Figure 4:
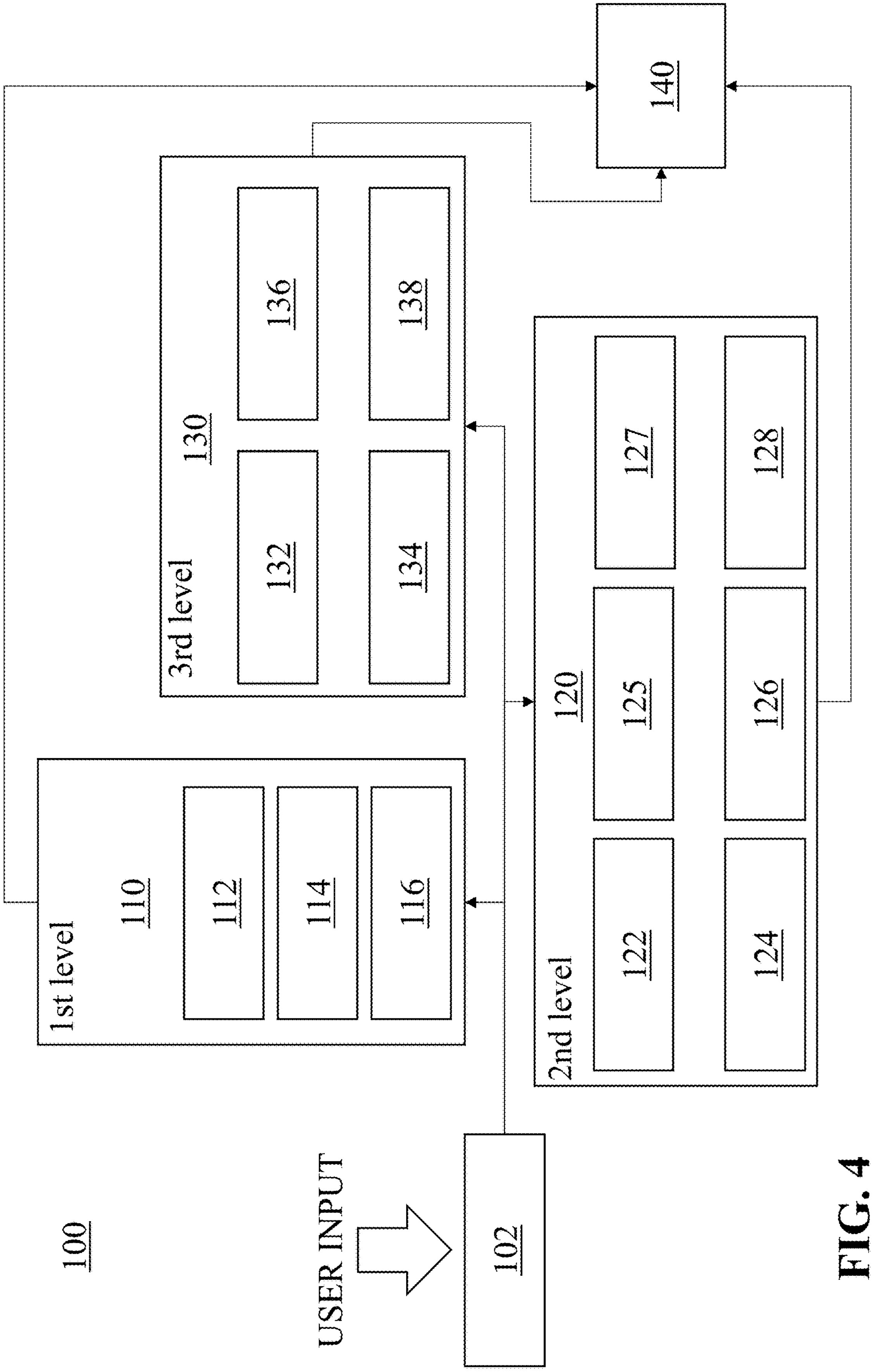
FIG. 4 depicts a schematic diagram of an architecture of a system using an IPA model for LLM operation according to some embodiments of the present invention.

FIG. 4 depicts a schematic diagram of an architecture of a system 100 using an IPA model for LLM operation according to some embodiments of the present invention. The system 100 is provided/designed based on the functions, features, and advantages described above. The system 100 includes a text receiver 102, a rule-based privacy checklist module 110 for a first-level configuration, a personalized learning module 120 for a second-level configuration, and a reasoning module 130 for a third-level configuration. In this regard, the first level includes rule-based privacy knowledge annotated from existing privacy laws and social norms; the second level develops a small language model that can be easily deployed on users' devices to offer personalized privacy judgments with contextual information; and the third level resorts to large language models on the cloud to improve the reasoning ability over long context such as multi-turn conversations to determine privacy violations.

The text receiver 102 is responsible for converting user-input text into a format that can be processed by the various modules of the system 100. In one embodiment, the user-input text is entered by the user typing on their smart device (i.e., edge device).

The text receiver 102 takes the raw textual input from users and transforms it into a structured format that is compatible with the rule-based privacy checklist module 110, the personalized learning module 120, and the reasoning module 130. Specifically, the text receiver 102 parses and preprocesses the input data to ensure it adheres to the required input formats for each module (i.e., machine-readable format). In various embodiments, for the rule-based privacy checklist module 110, the text receiver 102 organizes the text into a format suitable for initial privacy evaluation; for the personalized learning module 120, the text receiver 102 formats the text to be used in context-aware learning processes; and for the reasoning module 130, the text receiver 102 prepares the text to be used in advanced reasoning and decision-making tasks.

The rule-based privacy checklist module 110 receives input data from the text receiver 102 and includes a privacy norm collector module 112, a rule-based privacy evaluator module 114, a privacy judgement module 116.

The privacy norm collector module 112 queries a database storing related privacy laws (e.g., HIPAA) at regular intervals, retrieves updated privacy norms, and processes these norms to create annotated rules. These rules are then transmitted to the rule-based privacy evaluator module 114 via an internal communication path. The text receiver 102 converts the user-input text into a standardized format, which is then sent to the rule-based privacy evaluator module 114. The rule-based privacy evaluator module 114 processes the input data by comparing it against the annotated norms and rules using a rule-matching algorithm. Upon detecting any violations, the results are sent to the privacy judgment module 116. The privacy judgment module 116 compiles and formats the findings into a readable structured report, ensuring high-precision privacy judgments are made.

The personalized learning module 120 includes a contextual data processor module 122, a fine-tuned BERT module

124, a knowledge distillation module 125, a cloud-based foundation module 126, a reward module 127, and an edge device tiny module 128.

The contextual data processor module 122 receives user data from users' devices, which could be smartphones, tablets, or other edge devices, via the text receiver 102. It processes and interprets this data to understand contextual information thereof. The processed contextual information is then transmitted to the fine-tuned BERT module 124 via an internal data path. The fine-tuned BERT module 124 classifies whether the contextual information constitutes a privacy violation using pre-trained models and algorithms. The classification results are forwarded to the privacy judgment module 116 through a secure communication channel for updating its privacy assessment records.

The knowledge distillation module 125 extracts essential knowledge from a LLM to enhance a smaller BERT model within the fine-tuned BERT module 124. The knowledge distillation module 125 communicates with the cloud-based foundation module 126, which acts as a base model for privacy violation learning and knowledge distillation. The reward module 127 interacts with the cloud-based foundation module 126, receiving data and updating the cloud-based foundation module 126 based on identified privacy violations. This learning process can involve supervised fine-tuning or reinforcement learning from human feedback (RLHF). Once the cloud-based foundation module 126 is updated, the distilled knowledge is transmitted back to the knowledge distillation module 125.

Finally, outcome information produced in the personalized learning module 120 is fed to the edge device module 128, which processes user data locally by integrating the contextual data processor module 122, the fine-tuned BERT module 124, the knowledge distillation module 125, the cloud-based foundation module 126, and the reward module 127, so as to generate a local privacy report. The edge device module 128 is configured to enable on-device privacy judgments and learn users' privacy preferences without the need for constant cloud interaction. This local processing ensures faster response times and enhanced privacy protection by minimizing data transmission to external servers.

The reasoning module 130 includes a contextual integration module 132, a reasoning evaluator module 134, an in-context learning module 136, a server-side reasoning module 138.

The contextual integration module 132 receives data from users' devices via the text receiver 102 and is configured to integrate multi-turn dialog contexts to assess privacy. This involves aggregating sequences of user interactions over time to form a comprehensive context. The aggregated context is then transmitted to the reasoning evaluator module 134 via an internal data path.

The reasoning evaluator module 134 receives the integrated context from the contextual integration module 132 and utilizes chain-of-thought (CoT) reasoning to evaluate whether the entire context includes private information. The evaluation by the reasoning evaluator module 134 involves breaking down the context into logical steps and assessing each step for privacy violations. The results of this reasoning process are then forwarded to the in-context learning module 136 through a secure communication channel.

The in-context learning module 136 interacts with the reasoning evaluator module 134 and leverages few-shot in-context learning to refine privacy judgments. The refining by the in-context learning module 136 involves using a small number of examples/samples to train the model of the reasoning evaluator module 134 to improve its accuracy in identifying privacy violations. In one embodiment, the in-context learning module 136 works with the reasoning evaluator module 134 to provide step-by-step reasoning templates, which help structure the evaluation process and improve the precision of privacy assessments.

The server-side reasoning module 138 is a server or centralized computer that provides privacy judgments for cloud-based LLM interactions. Specifically, the server-side reasoning module 138 integrates the outcome information from the contextual integration module 132, the reasoning evaluator module 134, and the in-context learning module 136 to aggregate and process these inputs. This reasoning by the server-side reasoning module 138 enables it to deliver comprehensive privacy judgments for interactions occurring on the cloud and then generate a report on these findings.

The system 100 further includes a privacy interception module 140. The privacy interception module 140 is configured to actively monitor and intercept the transmission of user data when potential privacy violations are detected by the rule-based privacy checklist module 110, the personalized learning module 120, and the reasoning module 130 (i.e., three-level detection). Upon receiving input user data, after the three-level detection, the privacy interception module 140 analyzes the report from the rule-based privacy checklist module 110, the personalized learning module 120, the reasoning module 130, or combinations thereof. If the analysis indicates that the data involves sensitive or private information, the privacy interception module 140 intervenes by halting the data transmission process. This preemptive action by the privacy interception module 140 prevents the private data from being sent to external servers or other unintended recipients, thereby safeguarding the user's privacy. Additionally, the privacy interception module 140 generates alerts and logs the incident for further review, ensuring that appropriate measures are taken to address and rectify the privacy breach. The privacy interception module 140 can enhance user data protection and comply with privacy regulations more effectively.

Privacy is safeguarded by feeding the input user data into the AI model for deep analysis. This ensures that sensitive data is handled securely, simplifying operational processes for the system while reducing computer power consumption during operation. As a result, the integration of the AI model and the system speeds up computation and maximizes computational efficiency, all while maintaining strict privacy protections.

In summary, the proposed IPA framework offers a robust, multi-level approach to privacy judgments by integrating rule-based checks, personalized learning, and advanced reasoning. This comprehensive system effectively aligns with privacy norms defined by laws and regulations by considering the roles of the sender, receiver, and information subject in information transmissions. The innovative use of contextual integrity as the foundation for privacy judgments, combined with the novel integration of different privacy protection methodologies, ensures a high level of accuracy and effectiveness in safeguarding user privacy in LLMs. The IPA framework thus represents a significant advancement in privacy protection for LLMs, enhancing both their utility and security.

The functional units and modules of the processor and methods in accordance with the embodiments disclosed herein may be embodied in hardware or software. That is, the claimed processor may be implemented entirely as machine instructions or as a combination of machine instructions and hardware elements. Hardware elements include, but are not limited to, computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

The system may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The system may also be configured as distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A system using an intelligent privacy assistant model for large language models operations, comprising:
- a text receiver configured to parse and preprocess input data from at least one user so as to convert user-input text into a machine-readable format;
- a rule-based privacy checklist module configured to;
- query a database for retrieving privacy norms and processing these norms to create annotated rules; and
- process the input data from the text receiver and compare it against the annotated norms and rules, thereby compiling and formatting findings from the comparing into a readable structured report;
- a personalized learning module configured to receive the input data via the text receiver and configured to process and interpret the input data to understand contextual information thereof, wherein the personalized learning module comprises a fine-tuned Bidirectional Encoder Representations from Transformers (BERT) module configured to classify whether the contextual information constitutes a privacy violation, and wherein classification results by the fine-tuned BERT module are locally processed to generate a local privacy report;
- a reasoning module configured to:
- receive the input data via the text receiver and configured to integrate multi-turn dialog contexts to assess privacy based on server-side reasoning;
- extract integrated context and utilizes chain-of-thought (CoT) reasoning to evaluate whether entire context of integrated context has private information; and
- deliver comprehensive privacy judgments for interactions occurring on cloud at a stage of evaluation for the private information and generates a cloud-based report; and
- a privacy interception module configured to:
- actively monitor and intercept transmission of the input data when potential privacy violations in the input data are detected by the rule-based privacy checklist module, the personalized learning module, the reasoning module, or combinations thereof;
- analyze the readable structured report generated by the rule-based privacy checklist module, the local privacy report generated based on the classification results of the personalized learning module, and the cloud-based report generated by the reasoning module; and
- halt transmission of the input data to an external server or another unintended recipient if the analysis by the privacy interception module indicates that the input data involves sensitive or private information.

2. The system according to claim 1, wherein the rule-based privacy checklist module further comprises:
- a privacy norm collector module configured to query the database storing related privacy laws at regular intervals and to retrieve updated privacy norms for creating the annotated rules; and
- a rule-based privacy evaluator module configured to process the input data by comparing it against the annotated norms and the annotated rules using a rule-matching algorithm, wherein the annotated rules are transmitted to the rule-based privacy evaluator module from the privacy norm collector module.

3. The system according to claim 2, wherein the rule-based privacy checklist module further comprises:
- a privacy judgment module configured to compile and format the findings into the readable structured report, wherein comparing results made by the rule-based privacy evaluator module are transmitted to the privacy judgment module.

4. The system according to claim 3, wherein the personalized learning module further comprises:
- a contextual data processor module configured to receive the input data, process and interpret the input data to understand the contextual information, wherein the contextual information processed by the contextual data processor module is transmitted to the fine-tuned BERT module, and wherein the classification results made by the fine-tuned BERT module are further forwarded to the privacy judgment module for updating its privacy assessment records.

5. The system according to claim 4, wherein the personalized learning module further comprises:
- a knowledge distillation module configured to extract essential knowledge from a large language model (LLM) database to enhance a smaller BERT model within the fine-tuned BERT module; and
- a cloud-based foundation module configured to communicate with the knowledge distillation module and act as a base model for privacy violation learning and knowledge distillation.

6. The system according to claim 5, wherein the personalized learning module further comprises:

a reward module interacting with the cloud-based foundation module configured to:

receive data and updating the cloud-based foundation module based on identified privacy violations; and perform a learning process involving supervised fine-tuning or reinforcement learning from human feedback (RLHF);

wherein once the cloud-based foundation module is updated by the reward module, the distilled knowledge is transmitted back to the knowledge distillation module.

7. The system according to claim 1, wherein the reasoning module further comprises:

a contextual integration module configured to receive the input data and integrate the multi-turn dialog contexts, wherein the integration involves aggregating sequences of user interactions over time to form the comprehensive context to be extracted as the integrated context; and a reasoning evaluator module configured to receive the integrated context from the contextual integration module and utilize the CoT reasoning to evaluate whether the entire context includes the private information, wherein the evaluation by the reasoning evaluator module involves breaking down the integrated context into logical steps and assessing each step for privacy violations.

8. The system according to claim 7, wherein the reasoning module further comprises:

an in-context learning module configured to interact with the reasoning evaluator module and leverage few-shot in-context learning to refine privacy judgments, wherein the refining by the in-context learning module involves using a small number of examples or samples to train at least one model of the reasoning evaluator module.

9. The system according to claim 1, wherein the system is operated in a smartphone, a tablet, or an edge device.

10. A method using an intelligent privacy assistant model for large language models operations, comprising:

parsing and preprocessing, by a text receiver, input data from at least one user so as to convert user-input text into a machine-readable format;

querying, by a rule-based privacy checklist module, a database for retrieving privacy norms and processing these norms to create annotated rules;

processing, by the rule-based privacy checklist module, the input data from the text receiver and comparing the input data against the annotated norms and rules, thereby compiling and formatting findings from the comparing into a readable structured report;

receiving, by a personalized learning module, the input data via the text receiver;

processing and interpreting, by the personalized learning module, the input data to understand contextual information thereof, wherein the personalized learning module comprises a fine-tuned Bidirectional Encoder Representations from Transformers (BERT) module configured to classify whether the contextual information constitutes a privacy violation, and wherein classification results by the fine-tuned BERT module are locally processed to generate a local privacy report;

receiving, by a reasoning module, the input data via the text receiver;

integrating, by the reasoning module, multi-turn dialog contexts to assess privacy based on server-side reasoning;

extracting, by the reasoning module, integrated context and utilizing chain-of-thought (CoT) reasoning to evaluate whether entire context of integrated context has private information;

delivering, by the reasoning module, comprehensive privacy judgments for interactions occurring on cloud at a stage of evaluation for the private information;

generating, by the reasoning module, a cloud-based report;

monitoring and intercepting, by a privacy interception module, transmission of the input data when potential privacy violations in the input data are detected by the rule-based privacy checklist module, the personalized learning module, the reasoning module, or combinations thereof;

analyzing, by the privacy interception module, at least one of the readable structured report generated by the rule-based privacy checklist module, the local privacy report generated based on the classification results of the personalized learning module, and the cloud-based report generated by the reasoning module; and halting, by the privacy interception module, transmission of the input data to an external server or another unintended recipient if the analysis by the privacy interception module indicates that the input data involves sensitive or private information.

11. The method according to claim 10, further comprising:

querying, by a privacy norm collector module, the database storing related privacy laws at regular intervals and retrieving updated privacy norms for creating the annotated rules;

wherein the annotated rules are transmitted to a rule-based privacy evaluator module from the privacy norm collector module, and wherein the rule-based privacy evaluator module is configured to process the input data by comparing it against the annotated norms and rules using a rule-matching algorithm.

12. The method according to claim 11, wherein comparing results made by the rule-based privacy evaluator module are transmitted to a privacy judgment module, and wherein the method further comprising compiling and formatting, by the privacy judgment module, the findings into the readable structured report.

13. The method according to claim 12, further comprising:

receiving, by a contextual data processor module, the input data; and processing and interpreting, by the contextual data processor module, the input data to understand the contextual information, wherein the contextual information processed by the contextual data processor module is transmitted to the fine-tuned BERT module, and wherein the classification results made by the fine-tuned BERT module are further forwarded to the privacy judgment module for updating its privacy assessment records.

14. The method according to claim 13, further comprising:

extracting, by a knowledge distillation module, essential knowledge from a large language model (LLM) database to enhance a smaller BERT model within the fine-tuned BERT module, wherein a cloud-based foundation module configured to communicate with the knowledge distillation module acts as a base model for privacy violation learning and knowledge distillation.

15. The method according to claim 14, further comprising:

interacting, by a reward module, with the cloud-based foundation module for;

receiving, by the reward module, data and updating the cloud-based foundation module based on identified privacy violations;

performing, by the reward module, a learning process involving supervised fine-tuning or reinforcement learning from human feedback (RLHF);

wherein once the cloud-based foundation module is updated by the reward module, the distilled knowledge is transmitted back to the knowledge distillation module.

16. The method according to claim 10, further comprising:

receiving, by a contextual integration module, the input data;

integrating, by the contextual integration module, the multi-turn dialog contexts, which involves aggregating sequences of user interactions over time to form the comprehensive context to be extracted as the integrated context;

receiving, by a reasoning evaluator module, the integrated context from the contextual integration module; and utilizing, by the reasoning evaluator module, the CoT reasoning to evaluate whether the entire context includes the private information, wherein the evaluation by the reasoning evaluator module involves breaking down the integrated context into logical steps and assessing each step for privacy violations.

17. The method according to claim 16, further comprising:

interacting, by an in-context learning module, with the reasoning evaluator module; and leveraging, by the in-context learning module, few-shot in-context learning to refine privacy judgments, wherein the refining by the in-context learning module involves using a small number of examples or samples to train at least one model of the reasoning evaluator module.

18. The method according to claim 10, wherein the method is operated and activated via a smartphone, a tablet, or an edge device.

* * * * *